INVENTORS.
JOHN E. BURKDOLL
AND
HOWARD L. VAUGHN, JR

June 26, 1962 J. E. BURKDOLL ET AL 3,041,082
ADJUSTABLE TANDEM WHEEL CARRIAGE FOR
FARM IMPLEMENTS AND THE LIKE
Filed Dec. 22, 1959 4 Sheets-Sheet 2

INVENTORS.
JOHN E. BURKDOLL
AND
HOWARD L. VAUGHN, JR.
BY

INVENTORS.
JOHN E. BURKDOLL
AND
HOWARD L. VAUGHN, JR.

BY *Hiram A. Sturges*
  *agent*

June 26, 1962  J. E. BURKDOLL ET AL  3,041,082
ADJUSTABLE TANDEM WHEEL CARRIAGE FOR
FARM IMPLEMENTS AND THE LIKE
Filed Dec. 22, 1959  4 Sheets-Sheet 4

INVENTORS.
JOHN E. BURKDOLL
AND
HOWARD L. VAUGHN, JR.
BY

United States Patent Office 3,041,082
Patented June 26, 1962

3,041,082
ADJUSTABLE TANDEM WHEEL CARRIAGE FOR FARM IMPLEMENTS AND THE LIKE
John E. Burkdoll, R.R. 1, Rantoul, Kans., and Howard L. Vaughn, Jr., 4101 W. 23rd St., Topeka, Kans.
Filed Dec. 22, 1959, Ser. No. 861,247
7 Claims. (Cl. 280—34)

This invention relates to a carrier or trailer for farm implements, fertilizer tanks, and the like, and in particular a frame mounted on pairs of wheels with the wheels mounted to be turned through angles of 90° so that they may be positioned in tandem or abreast, and whereby the wheels are adjustable laterally for straddling rows of plants.

The purpose of this invention is to provide a carriage having pairs of wheels whereby the wheels are pivotally mounted so that they rock or swing in vertical planes to compensate for uneven terrain and wherein loads are distributed over greater areas.

With substantially all types of tractors, trucks, trailers and the like wheels are spaced considerable distance longitudinally and the load on any particular part of a vehicle or the like, is taken on a single wheel, or at one point. By this means shocks and jars resulting from the wheels striking rocks, lumps of soil, and the like are transmitted directly to the body of a trailer or the like. With this thought in mind this invention contemplates a wheel mounting whereby pairs of wheels are carried by rocker arms and the rocker arms, and also wheels on the rocker arms, are mounted to be turned through angles of 90° so that the wheels may be positioned in tandem or abreast and wherein the wheels move in vertical planes as the carrier travels over rough soil.

The object of this invention is, therefore, to provide means for mounting wheels in pairs, either in tandem or abreast, on carriers and the like.

Another object of the invention is to provide a carrier having wheels mounted on ends of rocker arms, in which the positions of the wheels is readily adjustable.

Another important object of the invention is to provide a carrier having wheels on ends of rocker arms in which the wheels are readily adjustable to rock longitudinally or transversely.

It is yet another object of the invention to provide a carrier having wheels positioned in tandem or abreast in which the wheels are adjustable laterally to compensate for different distances between rows of plants.

A further object of the invention is to provide a carriage for farm implements, fertilizer tanks, and the like in which the wheels thereof may be retracted for transportation on highways.

A still further object is to provide a carrier for farm implements, tanks and the like in which wheels thereof are in tandem and in which the tandem wheels are geared together so that a seeder is driven by the wheels.

And a still further object of the invention is to provide a tandem wheel assembly in which the wheels may be positioned in tandem or abreast, adjusted laterally to compensate for distances between rows of plants, and retracted for transportation in which a carrier for a tank, farm implement or the like, on which the wheels are positioned is of a simple and economical construction.

With these and other objects and advantages in view the invention embodies a transversely disposed beam or bloster with a tongue extended from the intermediate part and having plates with elongated slots therein on the under surface and positioned at the ends, discs having supports depending therefrom adjustably mounted on the plates and designed to be turned through an angle of 90°, rocker arms pivotally mounted in lower ends of the supports, adjustable wheel mountings on ends of the rocker arms, and sprockets and chains for rotatably connecting wheels mounted in tandem to a seeder.

Other features and advantages of the invention will appear from the following description taken in connection with the drawings, wherein.

Figure 1:
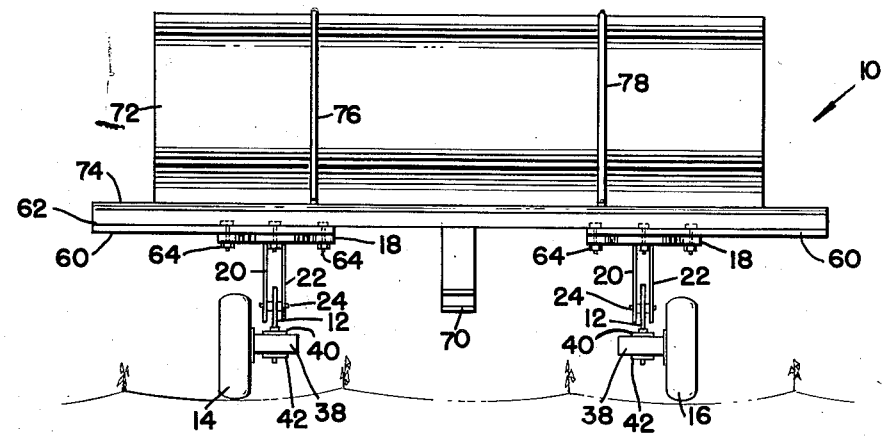
FIGURE 1 is a front elevational view showing a tank carrier mounted on wheels with the wheels positioned in tandem.
Figure 2:
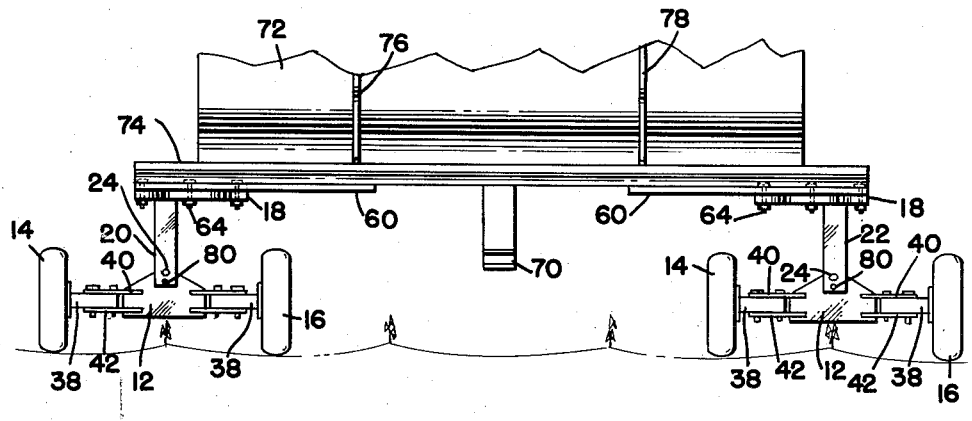
FIGURE 2 is a front elevational view similar to that shown in FIGURE 1 with the wheel mounting elements turned through an angle of 90° wherein the wheels are positioned abreast.
Figure 3:
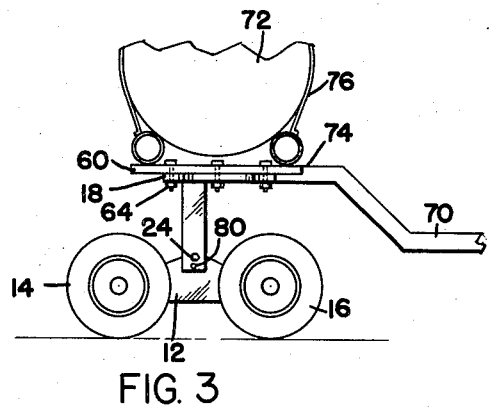
FIGURE 3 is an end elevational view of the carrier with parts broken away, and with the wheels positioned in tandem, as illustrated in FIGURE 1.
Figure 4:
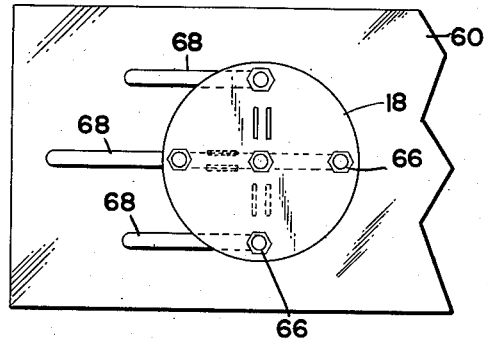
FIGURE 4 is a view looking upwardly showing the wheel mounting disc and plate at one side of the carrier with the rocker arm and wheels omitted, and with the inner end of the plate broken away.
Figure 5:
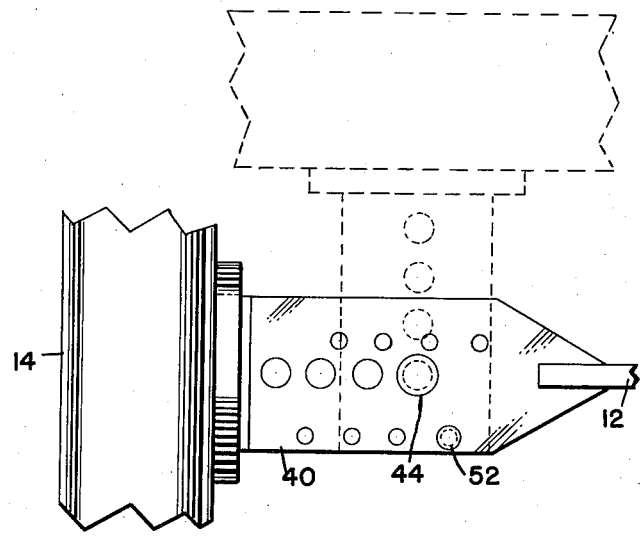
FIGURE 5 is a plan view of one of the connectors for attaching the wheels to the rocker arms with the parts in the positions shown in FIGURE 2 in full lines, and in the positions shows in FIGURE 1 in dotted lines, parts of the wheel and rocker arm being broken away.
Figure 6:
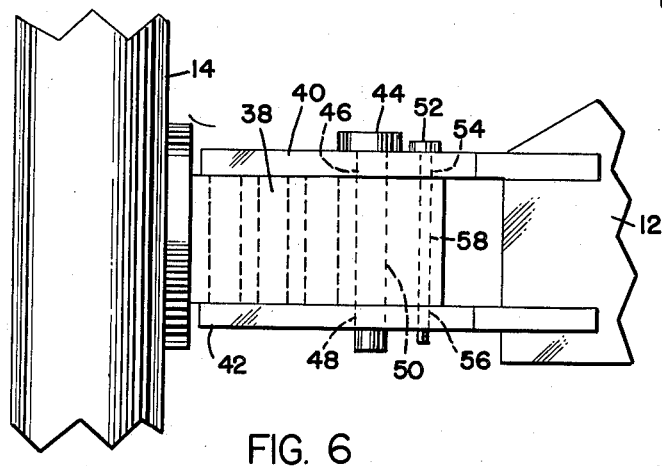
FIGURE 6 is a plan view of the connection shown in FIGURE 5 also with parts of the wheel and rocker arm broken away.

While three embodiments of the invention are illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 is used to designate a carrier or trailer or similar form of vehicle on which an embodiment of the invention is mounted.

Referring more in detail to FIGS. 1 to 6 inclusive the wheel mounting assembly is shown to include rocker arms 12 having wheels 14 and 16 rotatably connected to the opposite ends thereof. Positioned below the carrier or trailer 10 in elevated relation to the rocker arms 12 are apertured discs 18. Secured at their upper ends to the discs 18 are a pair of vertically disposed spaced parallel bars 20 and 22 and bolts 24 are used to connect the lower ends of the bars 20 and 22 to the rocker arms 12.

The wheels 14 and 16 are provided with tongues 38 that extend between bars 40 and 42 in which the tongues are held by pivot pins 44 which extend through openings 46 and 48 in the bars and 50 in the tongues. The tongues are secured in position by locking pins 52 that extend through openings 54 and 56 in the bars and registering openings 58 in the tongues. By this means the wheels may be retained in positions with axes thereof parallel to a plane extended transversely through the carrier, as shown in full lines in FIGURES 5 and 6, or positioned with axes thereof parallel to the longitudinal axis of the carrier, as shown in dotted lines in FIGURE 5.

The wheels are connected by the tongues to the bars 40 and 42 and the bars are integrally connected to the rocker arms, such as by welding, or the like. The rocker arms are connected to the support bars 20 and 22 by the bolts 24 and the support bars are connected to the discs 18 by welding, or the like. The discs are connected to elongated plates 60, which are secured to the under surface of the bolster or transverse beam 62 by welding, or the like, by bolts 64. The bolts 64 are positioned in openings 66 in the discs 18 and extend through elongated slots 68 in the plates 60. The slots 68 are of sufficient length to permit the wheels to be adjusted to compensate for different distances between rows of plants.

The beam 62 is provided with a tongue 70 and a tank 72 of fertilizer or the like may be secured to the platform 74 on the beam by straps 76 and 78.

With the wheels mounted in this manner the wheels move upwardly and downwardly with a rocking action as the carrier travels over uneven soil, and should it be desired to retain the rocker arms in fixed positions locking pins 80 may be inserted through the rocker arms and lower ends of the support bars 20 and 22.

Figure 7:
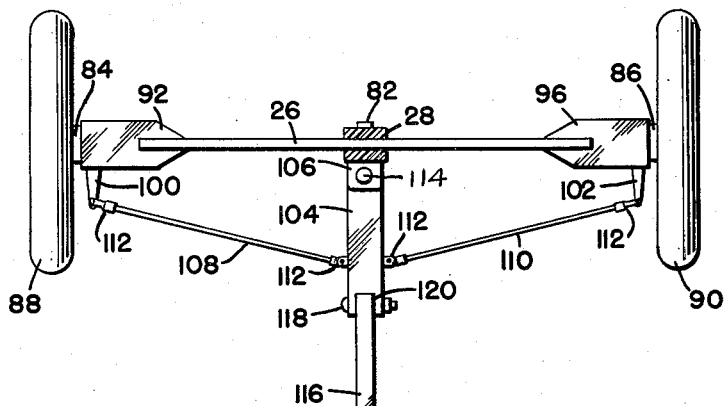
FIGURE 7 is a plan view showing a modification wherein wheels are pivotally mounted on ends of a rocker arm and connected by tie rods to a tongue.
Figure 8:
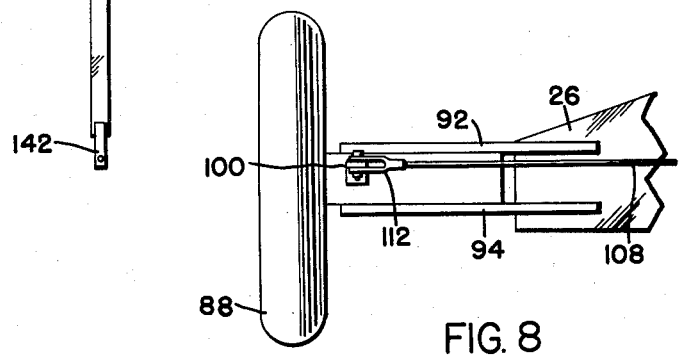
FIGURE 8 is an elevational view showing the connection at one side of the mounting shown in FIGURE 7, with the parts shown on an enlarged scale.

In the design shown in FIGURES 7 and 8 a lever 26, similar to the rocker arm 12 is pivotally mounted by a pin 82 in a support 28 and tongues 84 and 86 extended from wheels 88 and 90 are pivotally mounted between bars 92 and 94 that are connected to one end of the lever 26, and bars 96 and 98 connected to the opposite end of the lever 26. The tongues 84 and 86 are provided with arms 100 and 102, and the arms 100 and 102 are connected to a section 104 of a tongue 106 by rods 108 and 110. Each end of each of the rods 108 and 110 is provided with a clevis 112 by which the rods are connected to the arms and section of the tongue, respectively. The section 104 of the tongue is connected to the tongue 106 by a bolt 114.

In use the conventional tongue of an implement is removed and replaced by a tongue 116 which is secured to the end of the section 104 by a bolt 118. The tongue 116 is positioned in a slot 120 in the bifurcated end of the section 104.

The bars 92, 94, 96, and 98 are secured to the ends of the lever 26 by welding or the like.

Figure 9:
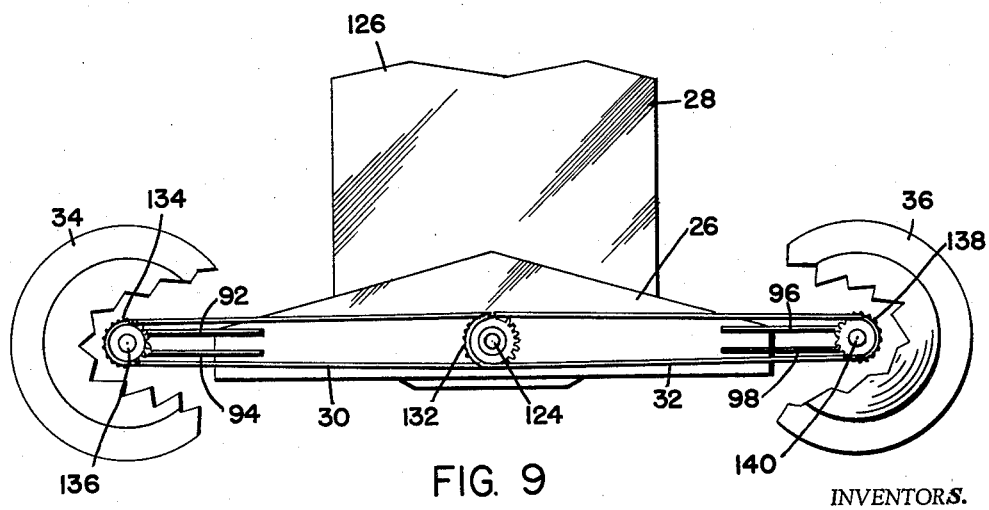
FIGURE 9 is a side elevational view of the arrangement illustrated in FIGURE 7 showing a further modification wherein the rocker arms and wheels are positioned in planes parallel to the longitudinal center of the carrier and parts of the wheels are broken away showing chains and sprockets in combination with the wheels.
Figure 10:
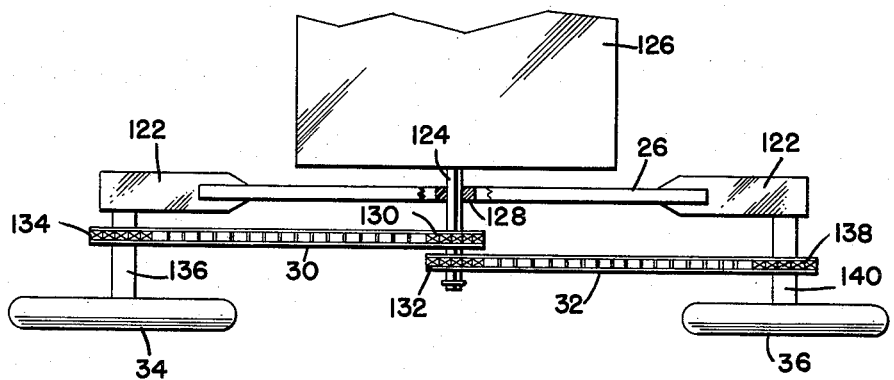
FIGURE 10 is a plan view of one side of the carrier with the parts as shown in FIGURE 9 and with the opposite side broken away.

In the design illustrated in FIGURES 9 and 10 the wheels 34 and 36 are mounted by bars 122 on ends of the lever 26, and a shaft 124 of a feed hopper 126, which is rotatably mounted in a bearing 128 in the lever 26, and the extended end of the shaft is provided with sprockets 130 and 132 over which the chains 30 and 32 are trained. The outer end of the chain 30 is trained over a sprocket 134 on a shaft 136 of the wheel 34, and the outer end of the chain 32 is trained over a sprocket 138 on a shaft 140 on which the wheel 36 is positioned. With the parts arranged and assembled in this manner the seed hopper is actuated by engagement of the wheels with the ground.

*Operation*

With the parts assembled as illustrated and described a carriage or carrier is provided wherein wheels thereof are provided in pairs and the pairs of wheels may be turned so that they are in tandem or abreast and so that the wheels may be adjusted laterally to compensate for different distances between rows of plants and the like.

In use a hitch 142 on the tongue of the carrier is connected to a draw-bar of a tractor, or other towing implement, and as the wheels travel over the soil the rocker arms permit the wheels to rock upwardly and downwardly without imparting shock loads to the carrier.

By use of the chains and sprockets the shaft of a drill or seeder may be rotated by the ground engaging wheels, so that additional driving means is not required.

From the foregoing specification it will become apparent that the invention disclosed will adequately accomplish the functions for which it has been designed and in an economical manner and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings.

Changes in shape, size, and arrangement of details and parts such as come within the purview of the invention claimed may be resorted to in actual practice, if desired.

Having now described the invention that which is claimed to be new and desired to be procured by Letters Patent, is:

1. An implement comprising a platform, discs mounted on the under surface of the platform and designed to be turned through an angle of 90°, supports depending from the discs, rocker arms pivotally mounted in lower ends of the supports, wheels carried by the ends of the rocker arms, and means for adjusting the positions of the wheels whereby the wheels are normal to the rocker arms or in planes spaced from and parallel to said rocker arms.

2. An implement comprising a platform, discs mounted on the under surface of the platform and designed to be turned through an angle of 90°, means for adjusting the discs laterally of the platform, supports depending from the discs, rocker arms pivotally mounted in the lower ends of the supports, means for retaining the discs in adjusted positions, wheels mounted on the ends of the rocker arms, and means for adjusting the positions of the wheels whereby said wheels may be positioned, selectively, in relation to said rocker arms so that said wheels are in tandem or abreast.

3. In a carriage for farm implements, the combination which comprises plates having elongated slots therein designed to be positioned on an implement, discs having radially disposed openings therein, means extending through said slots and said openings for adjustably mounting said discs on said plates, supports depending from the discs, rocker arms pivotally mounted in the lower ends of the supports, wheels adjustably mounted on the ends of the rocker arms, and means locking the rocker arms in stationary positions.

4. In a farm implement carrier, the combination which comprises a platform, horizontally disposed discs rotatably mounted on the under surface of the paltform, spaced vertically positioned parallel bars depending from said discs, rocker arms pivotally mounted in the lower ends of said bars, wheels positioned at the ends of the rocker arms, and means mounting the wheels on the rocker arms whereby the wheels are positioned in, selectively, longitudinal or laterally disposed planes.

5. In a farm implement carrier, the combination which comprises a platform, horizontally disposed discs rotatably and slidably mounted on the under surface of the platform, spaced vertically positioned parallel bars depending from said discs, rocker arms pivotally mounted in the lower ends of said bars, wheels positioned at the ends of the rocker arms, and means mounting the wheels on the rocker arms whereby the wheels are positioned in, selectively, longitudinal or laterally disposed planes.

6. In a farm implement carrier, the combination which comprises a platform, horizontally disposed discs rotatably and slidably mounted on the under surface of the platform, spaced vartically positioned parallel bars depending from said discs, said parallel bars being mounted in offset positions on said discs whereby rotation of the discs actuates the bars, selectively, to lateral or longitudinally disposed positions, rocker arms pivotally mounted in the lower ends of the bars, wheels positioned at the ends of the rocker arms, and means mounting the wheels on the rocker arms whereby the wheels are adjustable laterally of the carrier and also to positions, selectively, in longitudinal and laterally positioned planes.

7. In an implement carrier, the combination which comprises a beam positioned transversely of the carrier, a plate positioned on the lower surface of the beam, a disc positioned against the under surface of the plate, a bolt extended through the disc and plate, rotatably mounting the disc on the plate, said disc having radially disposed openings therein and said openings being positioned around said bolt, said plate having elongated slots therein and said slots being extended laterally from the openings of the disc and plate, means extended through said slots and said openings for adjustably mounting said disc on said plate, spaced parallel radially disposed bars depending from said discs, said bars being spaced outwardly from the centers of the discs, rocker arms pivotally mounted between said parallel bars, vertically spaced parallel bars extended from the ends of the rocker arms, tongues pivotally mounted between said vertically spaced parallel bars, and wheels rotatably mounted on said tongues, said tongues and wheels being arranged to turn through an angle of 90°, and said depending parallel bars being mounted to be turned with said discs through 360°.

References Cited in the file of this patent

UNITED STATES PATENTS

| | | |
|---|---|---|
| 1,021,652 | Atmar | Mar. 26, 1912 |
| 1,051,382 | Bevis | Jan. 28, 1913 |
| 2,268,465 | Townsend | Dec. 30, 1941 |
| 2,604,332 | Kent | July 22, 1952 |
| 2,736,567 | McMurray | Feb. 28, 1956 |
| 2,944,615 | Clark | July 12, 1960 |

FOREIGN PATENTS

| | | |
|---|---|---|
| 152,875 | Austria | Mar. 25, 1938 |
| 992,921 | France | July 18, 1951 |